(12) United States Patent
Uhrich et al.

(10) Patent No.: US 9,957,871 B2
(45) Date of Patent: May 1, 2018

(54) EXHAUST HEAT RECOVERY AND HYDROCARBON TRAPPING

(71) Applicant: Ford Global Technologies, LLC, Dearborn, MI (US)

(72) Inventors: Michael James Uhrich, West Bloomfield, MI (US); Joseph Norman Ulrey, Dearborn, MI (US); Giovanni Cavataio, Dearborn, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/010,688

(22) Filed: Jan. 29, 2016

(65) Prior Publication Data
US 2017/0218826 A1   Aug. 3, 2017

(51) Int. Cl.
| F01N 9/00 | (2006.01) |
| F02M 26/15 | (2016.01) |
| F02M 26/22 | (2016.01) |
| F02M 26/35 | (2016.01) |
| F01N 3/08 | (2006.01) |
| F02M 26/00 | (2016.01) |

(52) U.S. Cl.
CPC ............ *F01N 9/00* (2013.01); *F01N 3/0835* (2013.01); *F02M 26/15* (2016.02); *F02M 26/22* (2016.02); *F02M 26/35* (2016.02); *F01N 2240/02* (2013.01); *F01N 2390/00* (2013.01); *F01N 2410/03* (2013.01); *F01N 2570/12* (2013.01); *F02M 2026/004* (2016.02); *Y02T 10/20* (2013.01); *Y02T 10/47* (2013.01)

(58) Field of Classification Search
CPC ......... F01N 3/2892; F01N 3/021; F01N 3/101
USPC .......................................................... 60/274
See application file for complete search history.

(56) References Cited

U.S. PATENT DOCUMENTS

| 4,061,186 A | 12/1977 | Ljung |
| 4,450,932 A | 5/1984 | Khosropour et al. |
| 6,141,961 A | 11/2000 | Rinckel |
| 6,212,885 B1 * | 4/2001 | Hirota ................ B01D 53/9454 60/274 |
| 7,322,193 B2 | 1/2008 | Bering et al. |
| 7,987,836 B2 | 8/2011 | Kurtz et al. |
| 8,209,662 B2 | 6/2012 | Nathan et al. |
| 8,250,866 B2 | 8/2012 | Styles et al. |
| 8,375,701 B2 | 2/2013 | Lupescu et al. |
| 8,413,433 B2 | 4/2013 | Lupescu |
| 8,490,383 B2 | 7/2013 | Laermann et al. |

(Continued)

OTHER PUBLICATIONS

Uhrich, Michael James et al., "Method and System for Exhaust Gas Heat Recovery," U.S. Appl. No. 15/010,382, filed Jan. 29, 2016, 70 pages.

(Continued)

*Primary Examiner* — Jason Shanske
(74) *Attorney, Agent, or Firm* — Julia Voutyras; McCoy Russell LLP

(57) ABSTRACT

Methods and systems are provided for exhaust heat recovery and hydrocarbon trapping at an exhaust bypass assembly. Exhaust gas may flow in both directions through an exhaust bypass passage and each of a HC trap and a heat exchanger coupled to the bypass passage. The HC trap may be purged with the hot exhaust and heat from the exhaust may be recovered at the heat exchanger.

14 Claims, 5 Drawing Sheets

(56) References Cited

U.S. PATENT DOCUMENTS

| | | | |
|---|---|---|---|
| 8,615,983 B2 | 12/2013 | Knafl et al. | |
| 8,616,187 B2 | 12/2013 | Yamazaki et al. | |
| 8,635,852 B2 | 1/2014 | Lupescu et al. | |
| 8,661,815 B2 | 3/2014 | Ulrey et al. | |
| 9,689,295 B1* | 6/2017 | Uhrich | F02M 26/22 |
| 2009/0020260 A1 | 1/2009 | Miyagawa | |
| 2009/0049832 A1 | 2/2009 | Hase | |
| 2009/0120061 A1* | 5/2009 | Elwart | F01N 5/02 |
| | | | 60/274 |
| 2009/0120064 A1* | 5/2009 | Uhrich | F01N 3/2846 |
| | | | 60/278 |
| 2010/0223921 A1* | 9/2010 | Uhrich | F01N 3/0807 |
| | | | 60/311 |
| 2011/0072801 A1* | 3/2011 | Lupescu | F01N 3/031 |
| | | | 60/287 |
| 2011/0132337 A1* | 6/2011 | Lupescu | F01N 3/0835 |
| | | | 123/568.21 |
| 2011/0232362 A1 | 9/2011 | Thiagarajan et al. | |
| 2012/0216763 A1 | 8/2012 | Barnes | |
| 2012/0260897 A1 | 10/2012 | Hayman et al. | |
| 2013/0019847 A1 | 1/2013 | Nelson et al. | |
| 2013/0031967 A1 | 2/2013 | Ichimasa | |
| 2013/0037235 A1 | 2/2013 | Sakabe et al. | |
| 2013/0220288 A1 | 8/2013 | Klingbeil | |

OTHER PUBLICATIONS

Styles, Daniel Joseph et al., "Method and System for Exhaust Gas Heat Recovery," U.S. Appl. No. 15/010,537, filed Jan. 29, 2016, 72 pages.

* cited by examiner

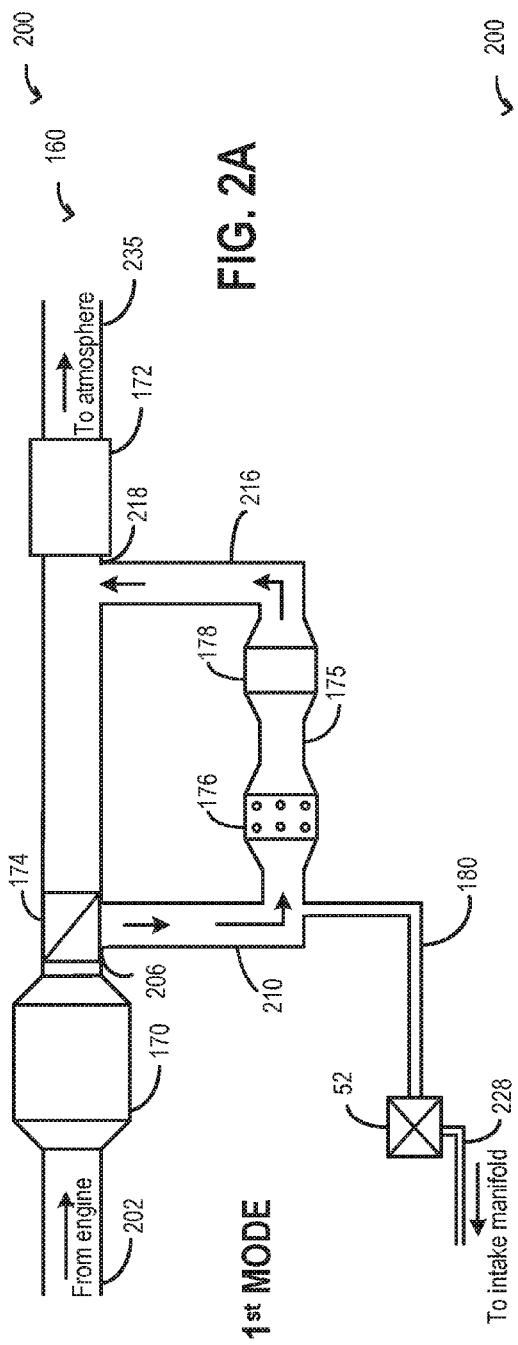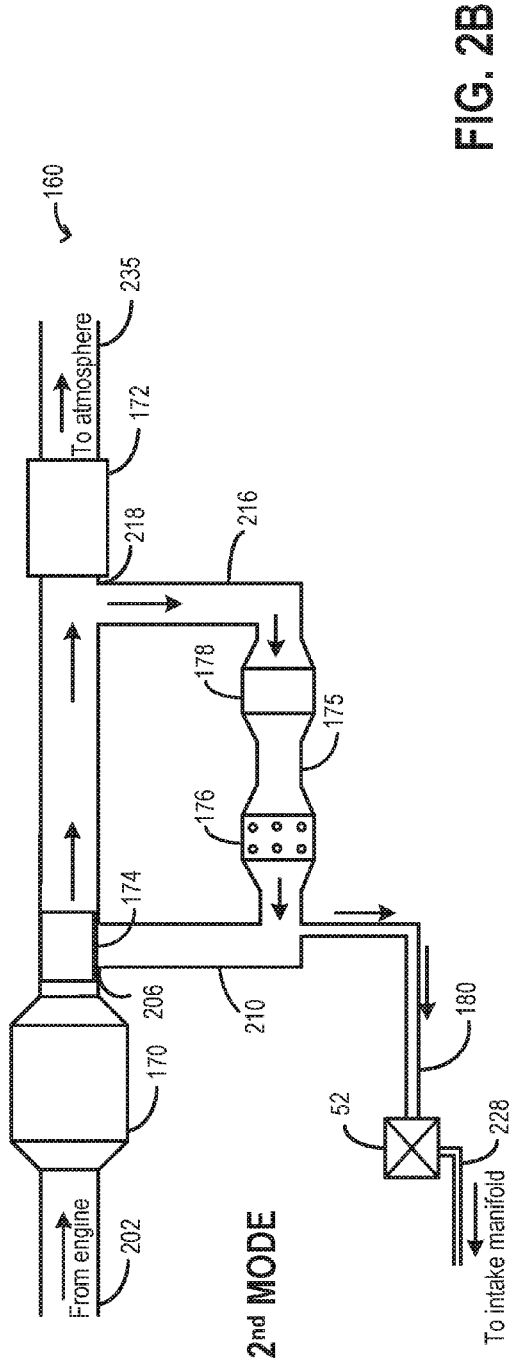

| Engine operating (functional) mode | EGR valve position | Diverter valve position (operational mode) | Direction of flow through heat exchange system | Direction of flow through HC trap | HC trap purge possible |
|---|---|---|---|---|---|
| 1 – Cold start/ EGR not required | Closed | 1st | First | First | No |
| 2 – Hot EGR required | Open | 1st | First | First | No |
| 3 – Cold EGR required | Open | 2nd | Second | Second | Yes |
| 4 – Coolant warm up required | Closed | 1st | First | First | No HC trap should be pre-purged |

FIG. 4

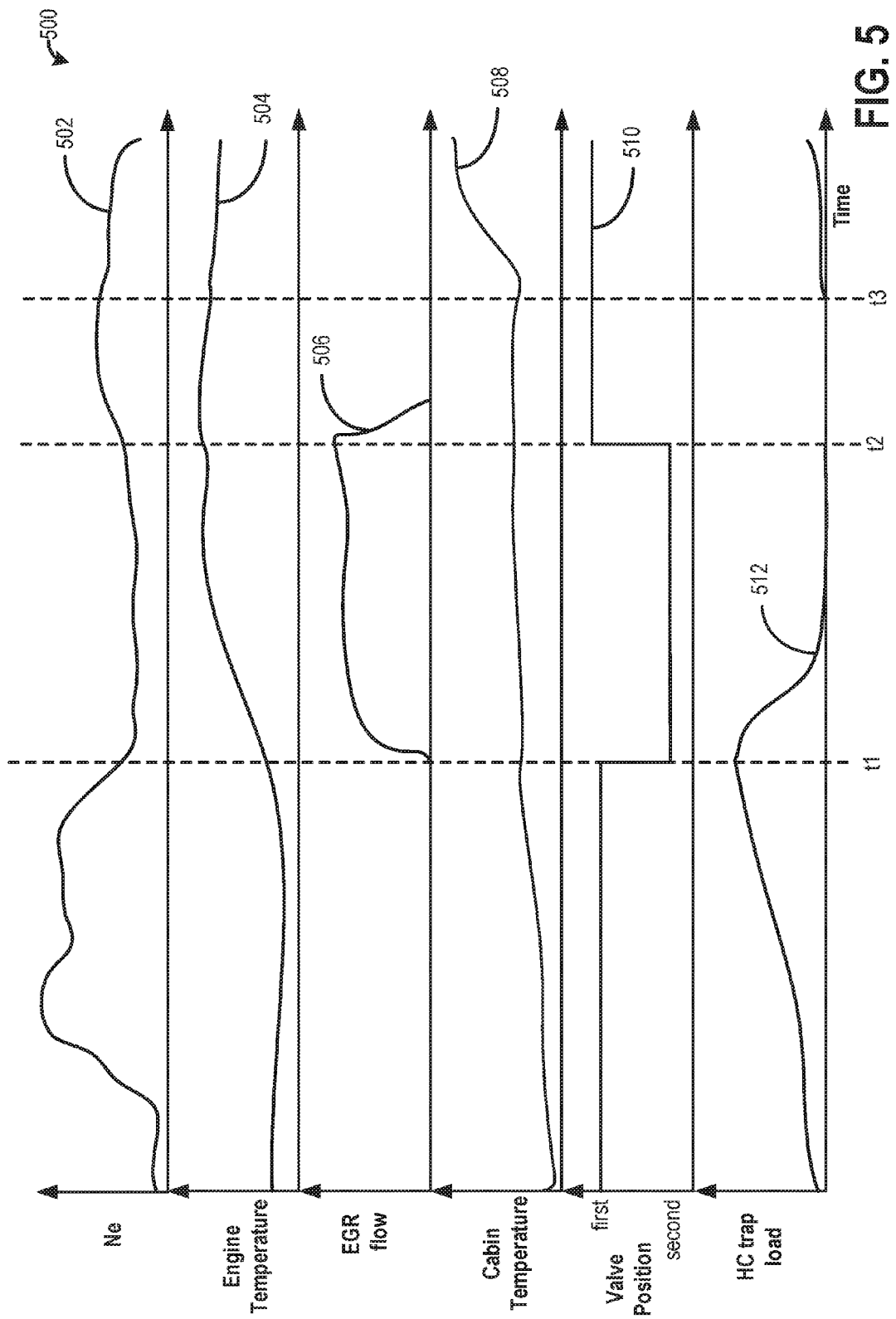

EXHAUST HEAT RECOVERY AND HYDROCARBON TRAPPING

FIELD

The present description relates generally to methods and systems for exhaust heat recovery and hydrocarbon trapping at an exhaust bypass assembly.

BACKGROUND/SUMMARY

Engines may be configured with an exhaust heat recovery system for recovering heat from an internal combustion engines exhaust energy. The heat is transferred from the hot exhaust gas to a coolant through an exhaust gas heat exchanger system. The heat from the coolant, circulated through the heater core, may be utilized for functions such as heating the cylinder head thus warming the passenger cabin quickly, thereby improving engine efficiency. In hybrid electric vehicles, the recovery of exhaust heat improves fuel economy by warming engine temperatures quicker, thereby allowing for a faster engine shut-off and extended use of the vehicle in an electric mode.

Exhaust heat may also be retrieved at an exhaust gas recirculation (EGR) cooler. An EGR cooler may be coupled to an EGR delivery system to bring down the temperature of recirculated exhaust gas before it is delivered to the intake manifold. EGR is used to reduce exhaust NOx emissions, improve fuel economy by reducing the throttling losses at low loads, and improve knock tolerance.

During cold start conditions and/or during engine idling, catalyst temperature may be low, for example lower than a light-off temperature. Due to low temperature, catalysts may not be able to effectively convert cold-start exhaust hydrocarbons. Hydrocarbon (HC) traps, such as those containing Zeolite, may be used to adsorb HC from a low temperature exhaust. The HC traps need to be purged periodically to remove the accumulated HC.

Several approaches are provided for trapping hydrocarbons exiting the catalyst during cold start conditions. In one example, as shown by Lupescu et al. in U.S. Pat. No. 8,635,852, a HC trap may be coupled to a bypass passage parallel to the main exhaust passage. During cold start conditions, exhaust may be routed through the HC trap before being released to the atmosphere through a tailpipe. Cold-start hydrocarbons may be adsorbed at the HC trap. After engine warm-up, hot exhaust is routed in an opposite direction through the HC trap, purging the trapped hydrocarbons to the engine intake manifold for combustion.

However, the inventors herein have recognized the above issues and potential disadvantages with the above approach. As one example, due to the position of the HC trap, exhaust entering the trap may not be cold enough for substantially all cold-start hydrocarbons to be adsorbed, leading to degraded exhaust emissions. In addition, water from the cold exhaust may condense on the HC trap, decreasing the HC storing functionality of the zeolite. The inventors have also recognized that it may be difficult to coordinate EGR cooling with exhaust heat recovery in such a system. In particular, the heat recovered at the EGR cooler cannot be effectively used for heating a cabin space due to low heat flux at lower mass flows. As a result, a distinct heat exchanger is required for cabin heating. Likewise, even if heat is extracted from exhaust at a heat exchanger, the cooled exhaust is not recirculated, resulting in the need for a distinct EGR cooler. The additional components add cost and complexity as well as difficulty in achieving the desired heat transfer for the distinct operations.

The inventors herein have identified an approach by which the issues described above may be at least partly addressed. One example method for an engine comprises: operating in a first mode with exhaust gas from do stream of an exhaust catalyst flowing through an exhaust bypass, and in a first direction through each of an upstream heat exchanger and a downstream hydrocarbon trap coupled in the exhaust bypass, and then to an exhaust tailpipe; and operating in a second mode with exhaust flowing from downstream of the exhaust catalyst through an exhaust passage, then in a second, opposite direction through the hydrocarbon trap and then through the heat exchanger, and then to the engine intake. In this way, cold start HC emissions can be reduced while recovering exhaust heat for cabin heating.

In one example, an engine system may be configured with a heat exchanger positioned downstream of a catalytic convertor in an exhaust bypass disposed parallel to a main exhaust passage. A hydrocarbon trap (e.g., zeolite based trap) may be positioned in the bypass downstream of the heat exchanger. A diverter valve may be used to enable exhaust to be diverted from downstream of the catalytic converter into the bypass, and through the heat exchanger and HC trap in one of two directions, a position of the diverter valve adjusted based on engine operating parameters. For example, during cold start conditions, the valve may be adjusted to flow exhaust through the bypass passage in a first direction through the heat exchanger, then through the HC trap, and then on to the exhaust tailpipe. During the flow in the first direction, exhaust heat is transferred to the heat exchanger and the cooled exhaust may flow through the HC trap wherein the hydrocarbons may be adsorbed. At the heat exchanger, the heat from the exhaust may be transferred to a coolant circulating and the hot coolant may then be used for functions such as cabin heating. By flowing the exhaust through the heat exchanger and then through the HC trap, condensate generated in the exhaust is delayed from entering the HC trap, enabling the exhaust HCs to be stored in the HC trap with a higher efficiency. In comparison, after engine warm up, the HC trap may be purged by adjusting the valve to flow hot exhaust through the main passage and then into the bypass, the exhaust flowing through the bypass in a second direction opposite to the first direction (through the HC trap and then through the heat exchanger) before the exhaust is recirculated to the engine intake via an EGR passage. The hot exhaust may purge the HC trap and the residuals may be routed to the engine intake manifold with EGR. The heat recovered at the heat exchanger during this flow is transferred to the circulating coolant, and thereon to a heater core for further use, such as in heating a passenger cabin and/or heating a cylinder head. Further, during conditions when coolant warm up is required and EGR is not required, the valve may be adjusted so that a portion of the exhaust can pass through the HC trap and heat exchanger before being returned to the main exhaust passage for release to the atmosphere. At the heat exchanger, heat from the exhaust may be transferred to the coolant thereby increasing coolant temperature.

In this way, the heating requirements of an engine system may be met using a single heat exchanger while reducing the emission of cold-start hydrocarbons. By flowing cold-start exhaust through a heat exchanger and then through a HC trap before releasing the exhaust through a tailpipe, the heat exchanger may delay the condensation of water in the cold exhaust from traveling to the downstream HC trap. As such, this delay allows the cold-start HCs to slip past the heat exchanger to the downstream HC trap, allowing the trap to be used substantially exclusively for exhaust HCs while the competing water is retained at the heat exchanger. At the same time, heat released at the heat exchanger can be advantageously used for heating a vehicle cabin space. Then, once the main catalyst has been warmed to light-off levels, the trapped HCs can be purged to the engine intake as EGR that is cooled at the heat exchanger. By providing the functions of an EGR cooler and an exhaust heat exchanger via a single heat exchanger, cost and component reduction benefits are achieved without limiting the functionality or capability of either system. In addition, by adding a HC trap downstream of the heat exchanger, cold start hydrocarbons may be effectively adsorbed. The technical effect of positioning the HC trap downstream of the heat exchanger is that water from the exhaust would condensate on the heat exchanger and water condensation on the Zeolite may be avoided thereby improving its efficiency. By using a diverter valve to regulate the flow of exhaust through a bypass passage, exhaust can be flowed in both directions across the heat exchanger and the HC trap. As such, this improves the heat transfer efficiency and facilitates HC trap purging. Overall, by improving the amount of waste heat that can be recovered from exhaust using fewer components, engine fuel economy and performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows an example embodiment of the exhaust bypass assembly of FIG. 1, operating in a first mode.

FIG. 2B shows an example embodiment of the exhaust bypass assembly of FIG. 1, operating in a second mode.

FIG. 4 shows a table illustrating the different modes of operation of the exhaust bypass assembly of FIG. 1.

FIG. 5 shows an example operation of the exhaust bypass assembly of FIG. 1.

DETAILED DESCRIPTION

Figure 1:
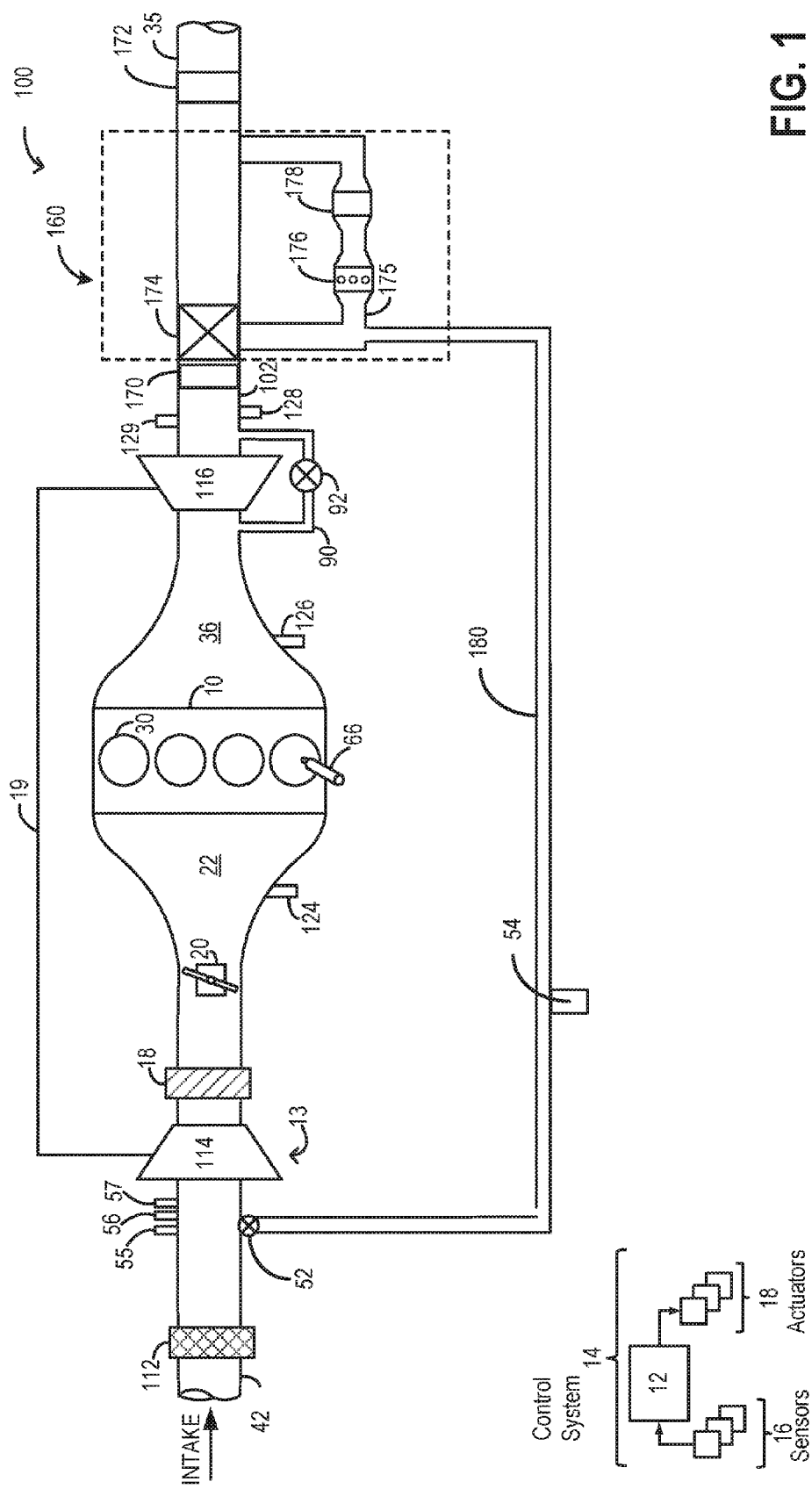
FIG. 1 shows an example embodiment of an engine system including an exhaust bypass assembly with a HC trap and a heat exchanger.

The following description relates to systems and methods for improving exhaust heat recovery using a single heat exchanger and hydrocarbon trap at an exhaust bypass assembly. An example engine system comprising an exhaust bypass assembly with a heat exchanger and a HC trap is shown in FIG. 1. A diverter valve is used to enable bidirectional flow of exhaust through the heat exchanger and the HC trap in the bypass assembly of FIG. 1. Two example modes of operation of the system of FIG. 1 are elaborated with reference to FIGS. 2A-2B, and 4. An engine controller may be configured to perform a control routine, such as the example routine of FIG. 3, to vary the position of the diverter valve in order to operate the exhaust bypass assembly in one of the plurality of example modes with exhaust flow through the heat exchanger and HC trap adjusted. Example operations of the exhaust bypass assembly are shown with reference to FIG. 5.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled, through charge-air cooler (CAC) 18 to throttle valve 20. Throttle valve 20 is coupled to engine intake manifold 22. From the compressor, the compressed air charge flows through the charge-air cooler 18 and the throttle valve to the intake manifold. In the embodiment shown in FIG. 1A, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via main exhaust passage 102 after passing through a muffler 172. An exhaust bypass 175 may be coupled to the main exhaust passage 102, downstream of the emission control device 170. The bypass passage 175 may extend from downstream of the emission control device 170 to upstream of a muffler 172 and may be configured substantially parallel to the main exhaust passage 102. A bypass assembly 160 is coupled in bypass passage 175. The bypass assembly 160 may include a heat exchanger 176 coupled to bypass passage 175 to cool the exhaust passing through the bypass passage 175. The bypass assembly 160 may further include a hydrocarbon (HC) trap 178 coupled to the bypass passage 175 downstream from the heat exchanger 176 to adsorb exhaust hydrocarbons, such as those escaping the emissions control device 170 during cold start conditions. Exhaust recirculation (EGR) delivery passage 180 may be coupled to the exhaust bypass passage 175 upstream of the heat exchanger 176. In particular, EGR passage 180 may be coupled to an inlet of heat exchanger 176. From downstream of the emission control device 170, exhaust may flow either via the main exhaust passage 102 or via the bypass passage towards the muffler 172.

A diverter valve 174 may be used to regulate the flow of exhaust through the exhaust passage and the bypass passage. Depending on operating conditions such as engine temperature, a portion of the exhaust residuals may be diverted through bypass passage 175 and thereon to tailpipe 35 or to the inlet of compressor 114 via exhaust recirculation (EGR) valve 52 and EGR passage 180. Further, depending on heating requirements of vehicle components, for example passenger cabin heating demand, exhaust can be made to flow through the bypass in a first or a second direction in order to extract heat from the hot exhaust at the heat exchanger and warm up the circulating coolant while also storing exhaust hydrocarbons in the HC trap. Also based on engine operating conditions, a direction of exhaust gas flow through the bypass passage 175 and across the heat exchanger 174 and HC trap 178 may be varied. In this way, the configuration allows for bidirectional flow of exhaust gas through the heat exchanger. The HC trap may be purged using hot exhaust flowing through it. EGR valve 52 may be opened to admit a controlled amount of exhaust to the compressor inlet for desirable combustion and emissions-control performance. EGR valve 52 may also be configured as a continuously variable valve. In an alternate example, however, EGR valve 52 may be configured as an on/off valve.

In one example, when the diverter valve 174 is actuated to a first position, the entrance to the bypass may be opened and exhaust may flow from downstream of the emission control device 170 into the bypass 175. Exhaust may then flow across the heat exchanger 176 and then through the HC trap 178 (in a first direction) and thereon to tailpipe 35. While flowing exhaust through the bypass 175 in the first direction, based on engine operating conditions, hydrocarbons from the cooled exhaust may be trapped in the HC trap. In another example, when the diverter valve 174 is in a second position, the entrance to the bypass passage proximal to the emission control device 170 may be closed and exhaust may flow through the main exhaust passage 35 downstream of the emissions control device 170 and the valve 174 and enter the bypass passage from upstream of the muffler 172. In this case, the exhaust may flow across the HC trap and heat exchanger 174 (in a second direction) and thereon the cooled exhaust may enter the EGR delivery passage 180. Opening of the EGR valve may be regulated to determine amount of exhaust entering the bypass passage 175 and the EGR delivery passage 180 compared to amount of exhaust flowing directly towards the tailpipe 35. The hydrocarbon load in the HC trap may be opportunistically purged with hot exhaust and the residuals may flow into the engine intake manifold for combustion.

As the exhaust gas passes through the heat exchanger 174 in either direction, heat from the hot exhaust gas may be transferred to a coolant circulating through the heat exchanger 174. In one example, the heat exchanger 174 is a water-gas exchanger. Upon transfer of heat from the exhaust gas to the coolant, the warmed coolant may be circulated through a heater core for further use in heating a cylinder head (such as when engine heating is requested) and/or heating a passenger cabin of the vehicle (such as when cabin heating is requested). Alternatively, when there are no heating demands, the warmed coolant may be flowed through a radiator for heat dissipation to the atmosphere.

Under conditions when EGR may not be desired by the engine and the HC trap has been purged to remove HC load (both small and large hydrocarbons have been removed), based on demand for coolant warm-up, the diverter valve 174 may be actuated back to the first position. In the first position, the entrance to the bypass may be open and exhaust may flow from downstream of the emission control device 170 into the bypass 175, pass through the heat exchanger 176 and HC trap 178 (in the first direction) and thereon exit the bypass passage to enter the main exhaust passage 102 upstream of the muffler 172. At the heat exchanger 176, heat from the exhaust may be utilized for coolant warm-up.

In this way, engine system 10 may be adapted to provide external, low-pressure (LP) EGR by tapping exhaust gas from downstream of turbine 116, the EGR cooled upon passage through a heat exchanger used for EGR cooling and exhaust heat recovery. Detailed description of the operation and structure of exhaust bypass assembly 160 will be discussed with relation to FIGS. 2, 3 and 4. In further embodiments, the engine system may include a high pressure EGR flow path wherein exhaust is drawn from upstream of turbine 116 and recirculated to the engine intake manifold, downstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor 54 may be provided for estimating an air-fuel ratio of the EGR. Alternatively, EGR conditions may be inferred by the one or more temperature, pressure, humidity and air-fuel ratio sensors 55-57 coupled to the compressor inlet.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and EGR sensor 54. Other sensors such as additional pressure, temperature, air/fuel ratio, and composition sensors may be coupled to various locations in engine system 100. The actuators 81 may include, for example, throttle 20, EGR valve 52, diverter valve 174, compressor recirculation valve 72, wastegate 92, and fuel injector 66. The control system 14 may include a controller 12. The controller 12 may receive input data from the various sensors, process the input data, and trigger various actuators in response to the processed input data based on instruction or code programmed therein corresponding to one or more routines. For example, based on engine operating conditions, EGR requirements, HC trap purge requirements and coolant warm-up demands, the controller 12 may regulate opening of the diverter valve 174 to direct exhaust gas in a first or a second direction through the heat exchanger. As another example, based on catalyst temperature inferred from exhaust temperature sensor 128, EGR valve opening may be adjusted to draw a desired amount of EGR from the exhaust passage 102 into the engine intake manifold. An example control routine is described with regard to FIG. 3.

FIG. 2A further elaborates the exhaust bypass assembly introduced in FIG. 1 and shows an example embodiment 200 of operating the exhaust bypass assembly of FIG. 1 in a first operating mode. In one example, assembly 200 is an embodiment of assembly 160 of FIG. 1 and therefore may share common features and/or configurations as those already described for bypass assembly 160. Exhaust bypass assembly 160 is fluidly coupled to exhaust passage 202 downstream of an emission control device 170. As discussed in relation to FIG. 1, one or more emission control devices 170 may include one or more exhaust after-treatment catalysts configured to catalytically treat the exhaust flow, and thereby reduce an amount of one or more substances in the exhaust flow.

Exhaust flowing from the engine passes through the emission control device 170 and reaches the exhaust bypass assembly 160 located further downstream along the exhaust passage 202. An inlet pipe 210 of the exhaust bypass assembly 160 is disposed on the exhaust passage 202 at junction 206 (downstream from emission control device 170). A diverter valve 174 is coupled to the exhaust passage 202 downstream from the junction 206. The diverter valve 174 may be used to regulate the flow of exhaust into the bypass assembly, through the inlet pipe 210. The inlet pipe 210 leads to a bypass passage 175 which may be parallel to the exhaust passage 202.

An inlet to the EGR passage 180 may be located on the bypass passage 175. Downstream from the EGR passage inlet, a heat exchanger 176 may be coupled to the passage 175. Further downstream from the heat exchange 176, a hydrocarbon (HC) trap may be coupled to the bypass passage 175. The HC trap may be a Zeolite based trap in order to adsorb Alkanes from the exhaust at low temperatures. A coolant may be circulated through the heat exchanger 176 for effective cooling of the exhaust passing through it, before the gas either enters the HC trap 178 and/or the EGR passage 180. Depending on engine requirements, it is possible to flow exhaust in both directions through the passage 175. During cold start conditions, HC may be effectively adsorb in the HC trap 178 and during warm conditions cooled EGR may be delivered through the EGR passage 180 to the engine intake manifold. An EGR valve 52 may control the delivery of EGR from the exhaust passage 202 to the passage 228 leading to engine intake manifold. Upstream of the HC trap 178, the bypass passage 175 ends in an outlet pipe 216 leading back to the exhaust passage 202. The inlet 210 and outlet pipes 216 may be at right angles to the bypass passage 175 and the main exhaust passage 202. The outlet pipe 216 joins the exhaust passage 202 at a junction 218 located downstream from the junction 206 and diverter valve 174. Further downstream of junction 218, a muffler 172 may be coupled to the exhaust passage 202. After passing through the muffler 172 the exhaust may be released to the atmosphere through a tailpipe 235. By locating all components of the exhaust bypass assembly downstream of the emissions control device (including catalyst) 170, thermal requirements may be relaxed.

By adjusting the position of the valves, the exhaust bypass assembly 200 may be operated in a first or a second operating mode. As such, the first operating mode represents a first position of the diverter valve 174 that enables exhaust flow control. It will be appreciated that various functional modes of the engine system may be possible while operating the assembly in the first operating mode, such as by varying the opening of an EGR valve. In the first operating mode, the diverter valve 174 may be held in a first position such that the opening to the inlet pipe 210 is open for exhaust to enter the bypass assembly 160. Due to the first position of the diverter valve 174, exhaust may not be able to flow further downstream through the exhaust passage 202 towards the tail pipe 235. In the first operating mode, the exhaust may flow into the exhaust bypass assembly though the inlet pipe 210 (as shown by the bold arrows) and the exhaust may then enter the bypass passage 175. EGR may not be desired for engine operations and consequently the EGR valve is closed preventing exhaust from entering the EGR passage 180. The exhaust may directly enter the heat exchanger 174 located further downstream from the EGR passage inlet on the bypass passage 175.

In the first operating mode, exhaust flows through the heat exchanger 176 in a first direction (from a first end of the heat exchanger 176 proximal to the inlet pipe 210 to the second end of the heat exchanger 176 proximal to the HC trap 178). After passing through the heat exchanger 174, the cooled exhaust flows through the Zeolite based HC trap in a first direction (from a first end of the HC trap 178 proximal to the heat exchanger 176 to a second end of the HC trap 178 proximal to the outlet pipe 216). After passing through the HC trap 178, the exhaust may flow through the outlet pipe 216 and exit the exhaust bypass assembly. Exhaust may re-enter the main exhaust passage 202 at the junction 218 and flow downstream towards the muffler 172. After passing through the muffler 172, the exhaust may be released to the atmosphere through the tailpipe 235.

The first operating mode can be selected when in one or more functional modes, such as a first functional mode where EGR is not required and a second where hot EGR is required for engine operations.

For example, in a first functional mode, where EGR is not required for engine operation, the assembly may be operated in the first operating mode with the EGR valve 52 held closed. EGR may not be required when the engine temperature is below a threshold (such as during cold start conditions), the threshold based on a catalyst light-off temperature. In the first functional mode, the exhaust does not enter the EGR passage and flows downstream through the heat exchanger 176 and HC trap 178 in the first direction.

At the heat exchanger 176, the exhaust may be cooled and the heat from the exhaust may be transferred to a coolant circulating through the heat exchanger 174. Any water present in the exhaust may condense at the heat exchanger 176. The coolant with the heat recovered from the exhaust may be circulated through a heater core of the vehicle and thereafter the recovered heat from the exhaust may be utilized for functions such as heating the cylinder head, and warming the passenger cabin, thereby improving engine efficiency.

During such cold start conditions (low engine temperature), the catalyst light-off temperature may be low and all hydrocarbons may not be effectively trapped and/or converted at the emissions control device 170. Due to the low temperature (below 100° C.) of the exhaust, the hydrocarbons escaping the emissions control device 170 may be adsorbed by the Zeolite in the HC trap 178. Since water condenses in the heat exchanger 176, water in the exhaust may not reach the HC trap 178. In this way by positioning the HC trap 178 downstream of the heat exchanger 176 water condensations on the HC trap 178 may be prevented thereby improving Zeolite functionality. In the first functional mode, after passing through the heat exchanger 174 and HC trap 178, the cooled exhaust flows out of the exhaust bypass assembly and exits to the atmosphere through the tailpipe 235.

In one example, even after engine warm up, EGR may not be desired by the engine based on operating conditions, e.g., engine load, engine speed, etc. Under such conditions, the assembly may be continue to operate in the first operating (and functional) mode with the EGR valve 52 held closed. After engine warm-up, the emission control device 170 may be fully functional and a small amount of hydrocarbons may escape the emission control device 170. This small amount of HC may be adsorbed at the HC trap 178 preventing it from escaping to the atmosphere thereby improving emission quality.

In a second functional mode such as when engine temperature is above a threshold and hot EGR is desired for engine operation, the exhaust bypass assembly may continue to operate in a first operating mode with the diverter valve 174 in first position. The controller may send a signal to an actuator coupled to the EGR valve 52 to actuate the EGR valve 52 to open position. Opening of the EGR valve 52 may be adjusted based on the request for hot EGR, the opening increased as the request for hot EGR increases. The exhaust may enter the bypass assembly 160 though the inlet passage 210. The entrance to the EGR passage 180 is located on the bypass passage upstream of an inlet of the heat exchanger. Therefore, depending on opening of the EGR valve, a first amount of the hot exhaust gas may enter the EGR passage 180 before passing through the heat exchanger 176. After passing through the EGR valve 52, the exhaust gas may enter the EGR passage and pass through the passage 228 leading to engine intake manifold to be delivered upstream of a compressor inlet. The remaining (second) amount of the exhaust gas that does not enter the EGR passage may pass through the heat exchanger 176 and HC trap 178 (in the first direction) and exit the exhaust bypass assembly. Thereafter, this second amount of the exhaust gas may pass through the muffler and be released to the atmosphere through tailpipe.

FIG. 2B shows a schematic view 200 of an example embodiment of an exhaust bypass assembly 160. The features of the exhaust bypass assembly 160 is described in relation to FIG. 2A. In FIG. 2B a second operating mode of the exhaust bypass assembly 160 is discussed as compared to the first operating mode described in FIG. 2A. Operating in the second mode includes actuating the diverter valve to a second, different position wherein flow of exhaust from downstream of the exhaust catalyst into the bypass is disabled. As such, the second operating mode represents a second position of the diverter valve 174 that enables exhaust flow control. It will be appreciated that various functional modes of the engine system may be possible while operating the assembly in the second operating mode, such as by varying the opening of an EGR valve.

In the second operating mode, the diverter valve 174 may be in the second position such that the entrance to the inlet pipe 210 of the exhaust bypass assembly 160 is closed. In order to deliver EGR, the EGR valve 52 may be opened, the opening of the EGR valve increased based on EGR demand. The opening of the diverter valve and the EGR valve may be regulated to determine the amount of exhaust gas entering the bypass assembly compared to the amount of exhaust gas flowing downstream through the main exhaust passage. In this second operating mode, due to positioning of the diverter valve 174, exhaust may not enter the exhaust bypass assembly through the inlet pipe 210 but rather pass through the diverter valve 174 and continue downstream along the exhaust passage 202. As the exhaust reaches the junction 218, a first amount of the exhaust may enter the exhaust bypass assembly through the outlet pipe 216 (used as inlet in this mode), as shown by bold arrows. A second amount of the exhaust may continue downstream along the exhaust passage 202 and exit to the atmosphere through the tail pipe 235 after passing through the muffler 172. The first amount of exhaust entering the bypass assembly may be controlled by the opening of the EGR valve 52. The first amount of exhaust entering the exhaust bypass assembly may continue to flow through the bypass passage 212 and enter the HC trap 178. After passing through the HC trap, exhaust may continue to flow downstream through the bypass passage 175 and across the heat exchanger 176. In the second mode, the exhaust flows through the HC trap 178 heat exchanger 176 in a second direction (from the second end of the HC trap 178 proximal to the outlet pipe 216 to the first end of the HC trap 178 proximal to the heat exchanger 176 and from a second end of the heat exchanger 176 proximal to the HC trap 178 to the first end of the heat exchanger 176 proximal to the inlet pipe 210). Heat from the exhaust may be transferred to a coolant circulating through the heat exchanger 176. In this operating mode, the EGR valve is in open position and the cooled exhaust (first amount) on exiting the heat exchanger 176 may enter the EGR passage 180. Due to the positioning of the diverter valve 174, exhaust may not pass through the bypass assembly and return to the exhaust passage 202 via the inlet pipe 210. Exhaust may pass thorough the EGR valve 52 and the passage 228 to enter the engine intake manifold. The second operating mode can be selected when in one or more functional modes, such as a third functional mode where cold EGR is required for engine operations.

In the third functional mode, cooled EGR may be desired by the engine. EGR may be desired when the engine temperature is above a threshold where the threshold may be based on a catalyst light-off temperature. Also, based on hydrocarbon load on the HC trap, it needs to be purged opportunistically. In this functional mode, as the hot exhaust passes through the HC trap, due to the high temperature (>100° C.) of the exhaust, the hydrocarbons especially the Alkanes adsorbed on the Zeolite may be removed. The residuals may flow with the exhaust towards the engine intake manifold for combustion. In this way, by flowing hot exhaust first through the HC trap, the trap may be purged opportunistically. After passing through the HC trap the exhaust flows through the heat exchanger (in second direction) and the exhaust is cooled before entering the engine intake manifold. To deliver EGR, the EGR valve 52 may be opened, opening of the EGR valve may be increased based on EGR demand. The cooled exhaust gas on exiting the heat exchanger 176 may enter the EGR passage 180. The exhaust gas may pass thorough the EGR valve 52 and the passage 228 to enter the engine intake manifold.

As previously described (FIG. 2A), depending on demand, the recovered heat may be transferred to the heater core for further utilization. When the engine temperature and vehicle cabin temperature is high, heat may be transferred from the heat exchanger 176 to a coolant circulating through a radiator, and heat is dissipated from the radiator to atmosphere.

In this way, cooled EGR may be delivered to the intake manifold after passing through the HC trap 178 heat exchanger 176. Also, the HC trap may be successfully purged in the process. EGR travel length from the exhaust passage to the intake manifold is short and therefore the latency of EGR delivered is low.

In one example, in a fourth functional mode, coolant warm-up may be desired such as during winter when passenger cabin heating maybe required over an extended period of time. Coolant warm-ups may only be initiated if it is confirmed that the HC trap 175 has been purged (such as in the third functional mode) and both small and large hydrocarbons have been cleansed. During this time, EGR may not be desired by the engine and consequently the EGR valve 52 may be in closed position and the bypass assembly 160 may be operated in the first operating mode. In the fourth functional mode, the exhaust entering the bypass assembly 160 does not enter the EGR passage and flows downstream through the heat exchanger 176 and HC trap 178 in the first direction. Heat may be extracted from the exhaust by a coolant circulating through the heat exchanger 176. Heat from the exhaust may be transferred to a coolant circulating through the heat exchanger 176, thereby increasing the coolant temperature. The recovered heat may be transferred to the heater core for further utilization in providing heat to vehicle components e.g. passenger cabin, cylinder head etc.

In this way, exhaust may flow through the heat exchanger and HC trap in both directions depending on EGR, HC purge and coolant warm-up requirements. The heat recovered at the heat exchanger may be further utilized for other vehicle functions, such as cabin heating. An engine controller may selecting between the first (FIG. 2A) and second (FIG. 2B) operating modes based on engine operating conditions such as engine temperature. For example, when the engine temperature is below a threshold (e.g., during a cold-start), EGR may not be desired by the engine and hydrocarbons escaping the emissions control device may need to be adsorbed. Consequently the exhaust bypass assembly may be operated in the first operating mode. In another example, when the engine temperature is above a threshold (e.g., after engine warm-up), cold EGR may be desired by the engine and the HC trap may have to be purged opportunistically. Consequently the exhaust bypass assembly may be operated in the second operating mode. In yet another example, coolant warm up may be required during vehicle operation and on confirmation that the HC trap has been purged clean, the exhaust bypass assembly may be operated in the first operating mode with waste heat recovered from the exhaust at the heat exchanger being used for coolant and cabin heating. In this way, the functions of an EGR cooler and an exhaust heat exchanger may be carried out via a single heat exchanger coupled to a bypass exhaust passage upstream from a HC trap. By including a HC trap downstream of the heat exchanger the hydrocarbons (e.g., Alkanes) escaping the emission control device coupled to the main exhaust passage may be adsorbed at the HC trap before the exhaust either enters the intake manifold (EGR) or is released to the atmosphere through the tailpipe (depending on operational mode).

FIGS. 1 and 2A-B show example configurations of exhaust bypass assembly with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Figure 3:
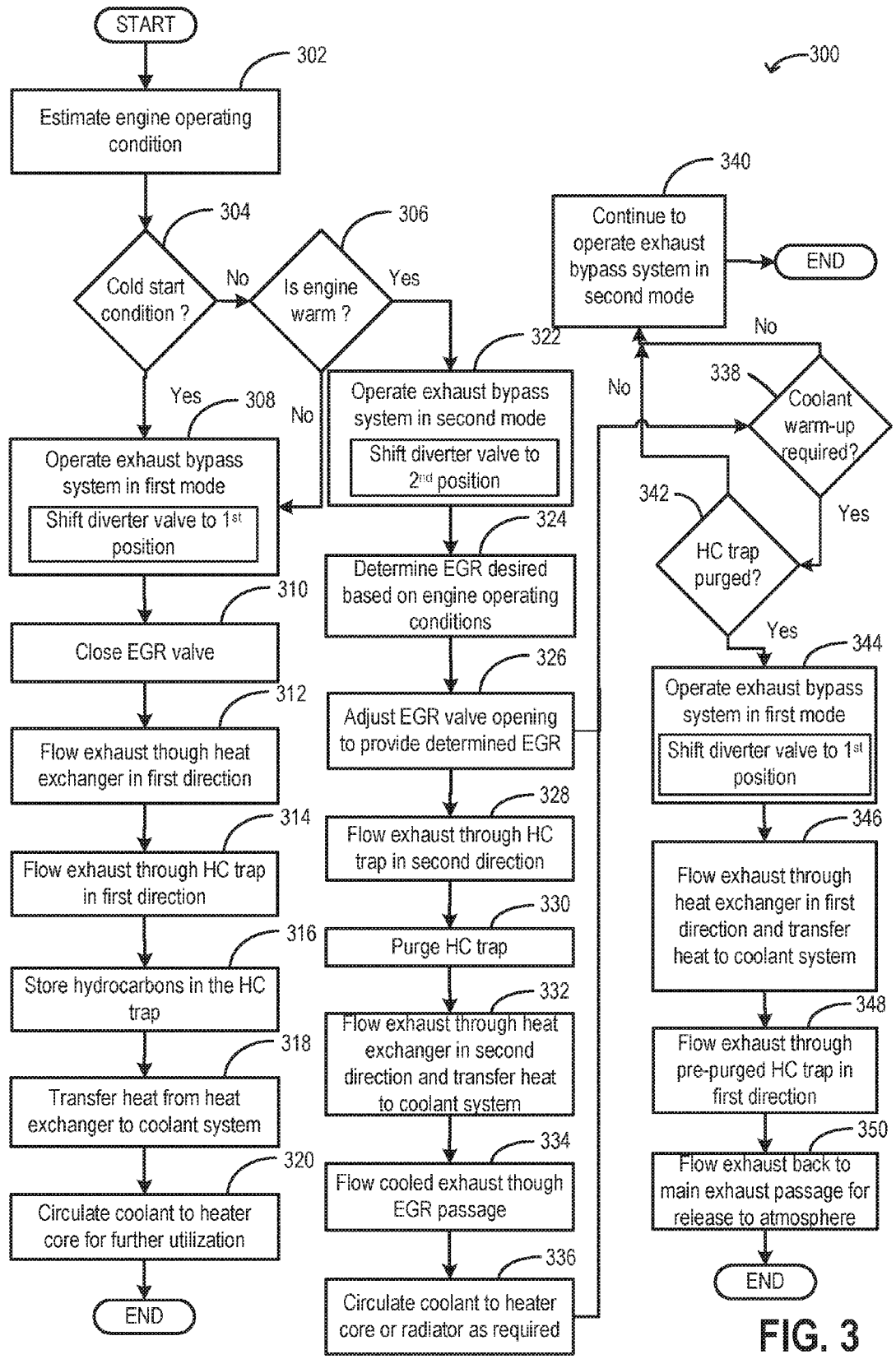
FIG. 3 shows a flow chart illustrating an example method that may be implemented for adjusting exhaust flow through the exhaust bypass assembly of FIG. 1.

FIG. 3 illustrates an example method 300 that may be implemented for adjusting exhaust flow through the exhaust bypass assembly of FIG. 1. Instructions for carrying out method 300 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the routine includes estimating and/or measuring current engine operating conditions. Conditions assessed may include, for example, engine temperature, engine load, engine speed, manifold vacuum, throttle position, exhaust pressure, exhaust air/fuel ratio, etc.

At 304, the routine includes determining if the vehicle engine is operating under cold start conditions. An engine cold-start condition may be confirmed when the engine is started after a prolonged period of engine inactivity, when the engine temperature is lower than a threshold (such as below an exhaust catalyst light-off temperature), and while ambient temperatures are below a threshold. During cold start conditions, exhaust gas recirculation (EGR) may not be desired for engine operations. Once the engine starts operating, the engine temperature increases due to combustion of fuel. If the vehicle is not in cold start condition, at 306, the routine includes determining if the engine is warm enough. Said another way, it is determined by the controller if the temperature of the engine is above a threshold. The threshold may be based on a catalyst light-off temperature.

If an engine cold-start condition is confirmed, and/or if the engine temperature is below the threshold, the routine moves to 308 in order to operate the exhaust bypass system in a first operating mode. The operation of the exhaust bypass assembly in the first mode has been described in relation to FIG. 2A. Operating in the first mode includes actuating the diverter valve (such as diverter valve 174 in FIG. 2A) to a first position wherein flow of exhaust from downstream of the exhaust catalyst into the bypass is enabled. Due to the first position of the diverter valve, exhaust may not be able to flow further downstream through the exhaust passage towards the tail pipe. Instead, exhaust may flow through the bypass assembly in a first direction, through the heat exchanger and then the HC trap. As such, during cold start conditions, EGR may not be desired by the engine. Since EGR is not desired during the engine cold-start, at 310, the EGR valve may be closed, disabling exhaust gas flow from the exhaust passage to the engine intake manifold.

At 312, by setting the exhaust bypass assembly to the first operating mode, exhaust gas may be flowed from downstream of an exhaust catalyst into the exhaust bypass, and then through a first end of the heat exchanger proximate to the exhaust catalyst, to a second end of the heat exchanger, proximate to the tailpipe. Said another way, exhaust may enter the exhaust bypass assembly through an inlet (first) pipe (such as pipe 210 in FIG. 2A) and flow through the bypass passage towards a heat exchanger (such as heat exchanger 176 in FIG. 2A). In this example, in the first mode, the exhaust flows in a first direction (from a first end of the heat exchanger proximal to the inlet pipe to the second end of the heat exchanger proximal to the HC trap) through the heat exchanger. Since the EGR valve is closed, exhaust may not flow through an EGR passage towards the engine intake manifold.

After passing through the heat exchanger, the exhaust enters the HC trap. In this example, in the first operating mode, at 314, the exhaust flows in the first direction (from a first end of the HC trap proximal to the heat exchanger to the second end of the heat exchanger proximal to the outlet pipe through the HC trap. During cold start conditions, the catalyst light-off temperature may be low and all hydrocarbons may not be effectively trapped and/or converted at the emissions control device (catalyst). Due to the low temperature (below 100° C.) of the exhaust coming out of the heat exchanger, at 316, the hydrocarbons escaping the emissions control device may be adsorbed by the Zeolite in the HC trap. Any water present in the exhaust may condense while passing through the heat exchanger. Thereby, water may not reach the HC trap, maintaining the functionality of the Zeolite. After passing through the heat exchanger, the exhaust may return to the main exhaust passage via an outlet pipe and exit to the atmosphere through a tail pipe.

At 318, waste heat is recovered at the heat exchanger. Specifically, heat from the exhaust gas is transferred to a coolant circulating through the heat exchanger. By transferring the heat from the exhaust gas to the coolant, at a location downstream of the exhaust catalyst, exhaust heat remaining after heating the exhaust catalyst can be advantageously used to warm the coolant circulating through the heat exchanger. As a result, the exhaust gas leaving the heat exchanger is cooled down.

At 320, the coolant warmed via heat transfer at the heat exchanger may be circulated to a heater core so that it can be utilized for heating other components of the vehicle during the engine cold-start, such as a cylinder head, an engine block, and a vehicle cabin space. In case of the cold start, the vehicle cabin temperature may be low and cabin heating may be requested by a vehicle operator. Thus, based on cabin heating demand, as requested by a vehicle operator (e.g., based on a cabin temperature setting), heat may be transferred from the heater core to the cabin. For example, air may be drawn into the cabin via the heater core, thereby enabling the cabin to be warmed. After meeting the cabin heating demand, the warmed coolant may also be circulated to an engine block and cylinder head to raise engine temperatures, thereby improving engine performance during cold conditions.

Returning to 306, if cold start conditions are not confirmed, and the vehicle engine is sufficiently warm, the routine moves to 322 wherein the exhaust bypass system may be operated in the second operating mode, as described with reference to FIG. 2B. As such, cooled EGR may be provided over a wide range of warmed up engine operating conditions so as to reduce NOx emissions and improve fuel economy while operating the bypass assembly in the second operating mode. In the second operating mode, the diverter valve may be in a second position such that flow of exhaust to the inlet pipe of the exhaust bypass assembly is disabled. Due to the positioning of the diverter valve, exhaust may not enter the exhaust bypass assembly through the inlet pipe but instead may pass through the diverter valve and continue along the main exhaust passage towards the tailpipe. An amount of the exhaust may be drawn into the exhaust bypass assembly from upstream of the tailpipe through the outlet pipe of the exhaust bypass assembly (used as inlet in this mode), to be delivered as LP-EGR. In this second operating mode, the cooled LP-EGR may be drawn from the bypass assembly upstream of the heat exchanger. The heat exchanger may cool the drawn exhaust passing through it thereby providing cooled LP-EGR. A remaining amount of the exhaust may be released to the atmosphere through the tail pipe. In one example, a ratio of a first amount of exhaust drawn into the bypass assembly via the outlet pipe relative to the second amount of exhaust released into the atmosphere via the tailpipe may be adjusted based on an EGR requirement of the engine, via adjustments to an EGR valve, as described below. At 324, the routine includes determining a cooled LP-EGR requirement of the engine. As an example, the controller may retrieve an amount of engine dilution required from a look-up table referenced by engine speed and load. At low-to-mid engine speed-load conditions, a higher amount of engine dilution may be requested. Based on the determined EGR or dilution requirement of the engine, at 326, the method includes increasing the opening of the EGR valve to admit a controlled amount of exhaust gas cooled upon passage through the heat exchanger to the intake manifold for desirable combustion and emissions-control performance. For example, the controller may send a signal to actuate an actuator coupled to the EGR valve, the actuator moving the EGR valve towards the open position.

In this example, in the second mode, at 328, the exhaust flows in a second direction (from a second end of the HC trap proximal to the outlet pipe to the first end of the HC trap proximal to the heat exchanger) through the HC trap. At 330, the HC load on the trap may be higher than a threshold load and due to the high temperature (above 100° C.) of the exhaust passing through the HC trap, the hydrocarbons especially the Alkanes adsorbed on the Zeolite may be removed. In this way, by flowing hot exhaust flows through the HC trap, the trap may be purged opportunistically. The residuals may flow with the exhaust towards the engine intake manifold for combustion. Flowing the purged exhaust hydrocarbons to the engine intake includes adjusting an opening of the EGR valve. Opening of the EGR valve may depend on the amount of EGR desired for engine operations. The amount of EGR desired depend on factors such as engine speed and engine load and is determined by engine mapping. Engine Mapping determines the desired EGR percentage for use at various speed-load points for best fuel economy and emissions quality. Also, several constraints (maximum EGR temperature, supply vacuum) on the mapping data optimization process are applied for combustion stability and hardware protection. The combustion stability may be based on the coefficient of variation (COV) of the indicated mean effective pressure (IMEP). As such EGR rate is regulated between 2% and 15%. Also, based on the estimated HC load, the opening of the EGR valve may be adjusted to enable the HC trap to be purged as completely as possible during the operation in the second operating mode. For example, a controller may estimate a HC load of the HC trap based on a previous duration of operation of the exhaust bypass assembly in the first operating mode (or a duration of cold-start operation). Thus, as the HC load of the trap increases, the EGR valve opening may be increased. Once the purging process is complete and a HC load of the HC trap is below the threshold load, the exhaust bypass assembly may continue to operate in the second operating mode.

After passing through the HC trap, the exhaust containing the HC load (due to purging of the HC trap) may continue to flow downstream through the bypass passage and across the heat exchanger. At 332, the exhaust may also flow through the heat exchanger in a second direction (from a second end of the heat exchanger proximal to the outlet pipe to the first end of the heat exchanger proximal to the HC trap). Heat from the exhaust may be transferred to a coolant circulating through the heat exchanger.

After flowing through the HC trap and the heat exchanger, at 334, the cooled exhaust containing the HC load from the HC trap may enter the EGR passage. Due to the positioning of the diverter valve, exhaust may not pass through the bypass assembly and return to the exhaust passage via the inlet pipe. The exhaust may pass thorough the EGR valve and the EGR passage to enter the engine intake manifold as low-pressure EGR.

Depending on heating demands from vehicle components (e.g., heating of passenger cabin, engine head etc.), at 336, the heat recovered from the exhaust may be transferred to the heater core. In particular, waste heat recovered from the exhaust at the heat exchanger may be transferred to a coolant, the heated coolant then circulated through a heater core. The heat from the coolant may then be utilized in heating vehicle components such as a passenger cabin, a cylinder head, etc., via the heater core. When the engine temperature and vehicle cabin temperature is high, waste heat recovered from the exhaust at the heat exchanger may be transferred from the heat exchanger to the coolant, and the heated coolant may be circulated through a radiator. Heat may be dissipated to the atmosphere at the radiator.

At 338, the routine includes determining if the coolant requires warm-up. Coolant warm-up may be required when the coolant temperature falls below a threshold value. As such, heat from the coolant is utilized for heating vehicle components the coolant may lose heat. When heating demands are high, coolant may require periodic warm-ups. If it is determined at 340 that coolant temperature is above the threshold, the exhaust bypass assembly may continue to be operated in the second operating mode.

If it is determined by the controller that the coolant temperature has dropped below the threshold and coolant warm-up is desired, at 342, the routine includes determining if the HC trap is in purged state. In order to initiate coolant warm-up, it is required to ensure that the HC trap has been cleaned of both small and large hydrocarbons. If the HC trap is not in purged prior to coolant warm-up, during coolant warm-up, as the exhaust bypass assembly is operated in the first mode, small hydrocarbons present in the HC trap may flow out of the tailpipe thereby affecting emissions quality. If it is determined that the HC trap purge has not been completed, at 340, the exhaust bypass assembly may continue to be operated in the second operating mode where the HC trap continues to be purged. If the HC trap is in purged state, at 344, the exhaust bypass system may be operated in the first operating mode that enables warm-up of coolant. In the first operating mode, the diverter valve may be in the first position such that the entrance to the inlet pipe of the exhaust bypass assembly is open. While operating in this mode, during coolant warm-up, EGR may not be desired for engine operations and consequently, the controller may send a signal to the actuator coupled to the EGR valve in order to actuate the EGR valve to closed position.

In the first operating mode, due to the position of the diverter valve, exhaust may enter the exhaust bypass assembly through the inlet pipe and may continue to flow downstream through the bypass passage and enter the heat exchanger. In this example, in the first mode, at 346, the exhaust flows from in the first direction (from a first end of the heat exchanger proximal to the inlet pipe to the second end of the heat exchanger proximal to the HC trap) through the heat exchanger. Heat from the exhaust may be transferred to a coolant circulating through the heat exchanger thereby increasing the coolant temperature. The recovered heat may be transferred to the heater core for further utilization in providing heat to vehicle components. The exhaust bypass assembly may be continued to be operated in this mode until the coolant temperature increases above the threshold.

At 348, after passing through the heat exchanger, exhaust may continue to flow downstream through the bypass passage and across the purged (clean) HC trap. In the first mode, the exhaust also flows through the HC trap in the first direction.

After passing through the HC trap, at 350, exhaust may return to the main exhaust passage via the outlet pipe. Thereon the exhaust may continue downstream through the main exhaust passage and exit to the atmosphere via the tailpipe. In this way a single heat exchanger may be used for cooling EGR and extracting heat from exhaust gas. A HC trap coupled to the bypass passage downstream of the heat exchanger may be used to adsorb hydrocarbons escaping the emission control device especially during cold start conditions.

FIG. 4 is a table 400 showing example modes of operation of the engine and the heat exchange system (exhaust bypass system) of FIG. 1. An engine controller may select one of the two operating modes based on engine conditions and heating requirements (functional modes). Based on the selected operating mode, the position of an exhaust gas recirculation (EGR) valve and diverter valve may be regulated to control the flow of exhaust gas through a HC trap, heat exchanger and/or through an EGR delivery passage.

In one example, the controller may operate the EGR valve and exhaust valve system in a first functional mode such as during a cold start condition when the engine temperature and vehicle temperature is low. During the low engine temperature (below threshold) conditions, EGR may not be required in the intake manifold. Therefore in this mode the EGR valve may be in closed position. In the first functional mode, the exhaust bypass assembly may operate in a first operating mode with the diverter valve in first position. In this functional mode, exhaust from the exhaust passage may enter the exhaust bypass assembly through an inlet (first) pipe and flow through the bypass passage towards a heat exchanger. Since the EGR valve is closed, exhaust may flow through the heat exchanger in a first direction (from a first end of the heat exchanger proximal to the inlet pipe to the second end of the heat exchanger proximal to the HC trap) while bypassing an EGR passage. The heat from the exhaust gas may be transferred to a coolant circulating through the heat exchanger. Heat recovered from the exhaust at the heat exchanger may be circulated through the vehicle heater core for utilization in vehicle components. As an example, heat recovered from the exhaust gas may be used to heat the passenger cabin during such cold start conditions. After passing through the heat exchanger, exhaust may flow through the HC trap also in the first direction (from a first end of the HC trap proximal to the heat exchanger to the second end of the heat exchanger proximal to the outlet pipe). Hydrocarbons especially alkanes escaping the emission control device coupled to the main exhaust passage may get adsorbed by the Zeolite present in the HC trap. In this mode, since cold exhaust flows through the HC trap, purging of the trap may not be possible. After passing through the heat exchanger and HC trap, the exhaust gas may return to the exhaust passage via an outlet (second) pipe and exit to the atmosphere through a tail pipe.

In another example, the controller may operate the EGR valve and exhaust valve system in a second functional mode such as when engine temperature is above a threshold and hot EGR is desired for engine operation. In the second functional mode, the exhaust bypass assembly may continue to operate in a first operating mode with the diverter valve in first position. Opening of the EGR valve may be adjusted based on the request for hot EGR, the opening increased as the request for hot EGR increases. The exhaust may enter the bypass assembly though the inlet passage. The entrance to the EGR passage is located on the bypass passage upstream of an inlet of the heat exchanger. Therefore, depending on opening of the EGR valve, a first amount of the hot exhaust gas may enter the EGR passage before passing through the heat exchanger. After passing through the EGR valve, the exhaust gas may enter the EGR passage and pass through the passage leading to engine intake manifold to be delivered upstream of a compressor inlet. The remaining (second) amount of the exhaust gas that does not enter the EGR passage may pass through the heat exchanger and HC trap (in the first direction) and exit the exhaust bypass assembly. Thereafter, this second amount of the exhaust gas may pass through the muffler and be released to the atmosphere through tailpipe. Also, in this functional mode, since cold exhaust flows through the HC trap, purging of the trap may not be possible. In yet another example, the controller may operate the EGR valve and exhaust valve system in a third functional mode when cold EGR may be desired for engine operations such as at high engine temperature and low engine load conditions. In the third functional mode, the exhaust bypass assembly may operate in a second operating mode with the diverter valve in second position. The EGR valve opening may be regulated to admit a controlled amount of cold exhaust gas to the intake manifold. The opening of the diverter valve and the EGR valve may be regulated to determine the amount of exhaust entering the bypass assembly compared to the amount of exhaust flowing downstream through the main exhaust passage. A first amount of exhaust from the exhaust passage may enter the exhaust bypass assembly through the second pipe and flow through the bypass passage towards the HC trap. In this operating mode, the exhaust may flow in a second direction (from a second end of the HC trap proximal to the outlet pipe to the first end of the HC trap proximal to the heat exchanger) through the HC trap. As hot exhaust passes through the HC trap, in this mode, it is possible to opportunistically purge the HC trap. After passing through the HC trap, exhaust flows through the heat exchanger also in the second direction (from a second end of the heat exchanger proximal to the HC trap to the first end of the heat exchanger proximal to the inlet pipe). The heat from the exhaust may be transferred to a coolant circulating through the heat exchanger. Based on demand, heat recovered from the exhaust gas at the heat exchanger may be either circulated through the vehicle heater core for utilization in other vehicle components or transferred to a vehicle radiator for dissipation to atmosphere. After flowing through the heat exchanger, the cold exhaust may flow through the EGR passage and the EGR valve towards the engine intake manifold. A second amount of the exhaust gas may not enter the exhaust bypass assembly but may flow downstream through the exhaust passage towards the tailpipe for exiting to the atmosphere.

In a further example, the controller may operate the EGR valve and exhaust valve system in a fourth functional mode when coolant warm-up may be required such as during conditions of high heat demand. In order to operate the exhaust bypass assembly in the fourth functional mode, it may be ensured that the HC trap has been purged (small and large hydrocarbons removed) prior to coolant warm-up. In the fourth functional mode, the exhaust bypass assembly may operate in the first operating mode with the diverter valve in first position. Also, in this functional mode, EGR may not be desired for engine operations and consequently the controller may send a signal to the actuator coupled to the EGR valve to actuate the EGR valve to closed position. Due to the positioning of the diverter valve, exhaust may enter the exhaust bypass assembly through the inlet pipe and may continue to flow through the bypass passage and enter the heat exchanger. After flowing through the heat exchanger in the first direction, exhaust may continue to flow downstream through the bypass passage. Heat from the exhaust may be transferred to a coolant circulating through the heat exchanger thereby increasing the coolant temperature. The recovered heat may be transferred to the heater core for further utilization in providing heat to vehicle components. Exhaust may continue to flow through HC trap in the first direction. During operation in this mode, the HC trap may not be purged. After passing through the HC trap, exhaust may return to the main exhaust passage via the outlet pipe. The exhaust may then continue downstream through the main exhaust passage and exit to the atmosphere through the tailpipe.

In this way, a diverter valve may be used to regulate exhaust gas flow in opposite directions through the HC trap and heat exchanger. A single heat exchanger may be effectively used for EGR cooling and heat recovery of heat from the exhaust gas. During cold start conditions, hydrocarbons, especially alkanes, may be adsorbed at the HC trap which may then be opportunistically purged using hot exhaust.

FIG. 5 shows an example operating sequence 500 illustrating operation of the exhaust bypass assembly of FIG. 1. The direction of exhaust gas flow through an exhaust bypass assembly and exhaust gas recirculation (EGR) delivery is determined based on engine operations. The horizontal (x-axis) denotes time and the vertical markers t1-t3 identify significant times in the operation of the exhaust bypass assembly system.

The first plot (line 502) from the top shows variation in engine speed over time. The second plot (line 504) shows variation in engine temperature. The third plot (line 506) shows EGR requirement by the engine for desired combustion and emissions-control performance. EGR requirement may depend on engine operating conditions e.g. engine load, engine speed, engine temperature etc. The fourth plot (line 508) shows variation in vehicle cabin temperature over time. The fifth plot (line 510) indicates the position of a diverter valve located on the exhaust passage. The position of the diverter valve may be adjusted to one of first and second position. The sixth and final plot (line 512) shows the variation in hydrocarbon load in the hydrocarbon (HC) trap over time.

Prior to time t1, the engine starts from rest after a period of inactivity during which the vehicle was not propelled using the engine. The engine may start under cold start conditions with low engine temperature as seen in plot 504. As the engine starts, the engine speed is low and the engine speed gradually increases to a steady level (plot 502). During cold start conditions, EGR may not be desired by the engine, accordingly plot 506 shows little or no EGR flow from the exhaust passage to the engine intake manifold. During this time, the vehicle cabin temperature (plot 508) may be low as the cabin heating may not have been operational prior to engine start-up. The vehicle cabin temperature may gradually increase over time as heat is supplied to the cabin from the vehicle heater core.

During cold start conditions and/or during engine idling, catalyst light-off temperature may be low. Due to low temperature, catalysts may not effectively convert hydrocarbons emitted from the engine along with exhaust. Also during cold start conditions, EGR is not desired for engine operations. The diverter valve coupled to the main exhaust passage may be maintained in first position such that the opening to the inlet pipe is open for exhaust to enter the bypass assembly. The EGR valve is in closed position preventing any exhaust gas from entering the exhaust delivery passage. A heat exchanger and a HC trap may be coupled to an exhaust bypass passage. Due to the first position of the diverter valve, exhaust may not be able to flow further downstream through the exhaust passage towards the tail pipe. Therefore, exhaust enters the bypass assembly via a first pipe. As the exhaust gas passes through the heat exchanger in a first direction (from a first end of the heat exchanger proximal to the inlet pipe to the second end of the heat exchanger proximal to the HC trap), heat from the exhaust may be transferred from the exhaust to a coolant circulating through the heat exchanger. After passing through the heat exchanger, the cooled exhaust may enter the HC trap. Due to the low temperature of the exhaust, hydrocarbons may get adsorbed at the HC trap. Accordingly, the HC load deposited on the HC trap is seen to increase with time. Thereafter, exhaust may exit the exhaust bypass assembly. The exhaust may pass through a muffler coupled to the exhaust passage and may be released to the atmosphere through an exhaust tailpipe.

The heat recovered from the exhaust at the heat exchanger may be utilized for providing heating for the vehicle cabin and/or a plurality of vehicle components e.g., at a cylinder head. The coolant from the heat exchanger may be circulated from the heat exchanger to the vehicle heater core for utilization in heating different vehicle components. In this example, since prior to t1 the vehicle cabin temperature is low, the heat recovered from the exhaust gas may be utilized in heating the cabin to a temperature desired by the user.

At time t1, there is a decrease in engine speed. This may be due to lower engine load. Also at this stage, there is an increase in engine temperature. Due to lower engine speed and higher engine temperature, cold EGR may be desired by the engine. Also, the HC load deposited on the HC trap may be high and purging of the HC trap may be desired as the HC load on the trap reaches a threshold load. In order to deliver cold EGR from the exhaust passage to the engine intake manifold, the diverter valve may be shifted to second position at t1. At this position of the diverter valve, exhaust may not enter the exhaust bypass assembly through the first pipe but rather pass through the diverter valve and continue downstream along the exhaust passage. The exhaust may enter the bypass assembly though a second pipe disposed proximal to the tailpipe and flow through the HC trap in a second direction (from a second end of the HC trap proximal to the outlet pipe to the first end of the HC trap proximal to the heat exchanger). At t1, the HC load is higher than a threshold value and consequently the HC trap is being purged. Due to the high temperature (above 100° C.) of the exhaust passing through the HC trap, the hydrocarbons especially the Alkanes adsorbed on the Zeolite may be removed. Accordingly, between time t2 and t3, as seen from plot 512, there is a decrease in HC load in the HC trap.

Also between t2 and t3, the EGR valve is maintained in an open position. After passing through the HC trap, exhaust may flow though the heat exchanger in the second direction (from a second end of the heat exchanger proximal to the HC trap to the first end of the heat exchanger proximal to the inlet pipe), thereby cooling the exhaust. The cooled exhaust may then enter the EGR delivery passage through the EGR valve. The residuals from the HC trap may flow with the exhaust towards the engine intake manifold for combustion. As seen from plot 506, during this time period, the EGR flow into the intake engine manifold increases. In this way cold EGR may be delivered from the exhaust passage to the engine intake manifold and HC trap may be purged as required. During this time, heat recovered from the exhaust at the heat exchanger may be continued to be utilized for providing heating for the vehicle cabin in order to increase the vehicle cabin temperature. As seen from plot 508, the cabin temperature continually increases over time.

At time t2, the engine speed is seen to increase once again. At this time, the engine temperature is high and stable. EGR may no longer be desired by the engine and therefore the EGR valve is actuated to closed position. This may be due to increase in engine load, engine speed and/or other engine operating parameters. As seen from plot 506, EGR flow decreases and eventually become zero (as the EGR valve is actuated to closed position) within a short time after time t2. The passenger cabin may still require heating. As heat from the coolant circulating through the heat exchanger is continually used for cabin heating and other heating purposes, the temperature of the coolant may decrease. At time t2, in response to the temperature of the coolant decreasing below a threshold, coolant warm-up is desired to effectively continue with the cabin heating functions. In this example, the HC trap has been purged between time t1 and t2, therefore HC deposit on the trap is minimal, making it possible to initiate coolant warm-up. If HC load is high in the trap, coolant warm-up may need to be delayed until HC trap purging is complete. This is to ensure that hydrocarbons do not escape the trap and enter the heat exchanger and eventually return to the main exhaust passage.

At time t2, the diverter valve may be shifted to the first position. During time t2 and t3, exhaust may enter the bypass assembly through the first pipe (proximal to the emissions control device) and flow through the heat exchanger and HC trap in the first direction before exiting the assembly via the second pipe. As the HC trap has been just been purged, it does not have any HC load. Also after engine warm-up, the catalyst (coupled to the main exhaust passage) if fully functional thereby effectively converting and/or adsorbing hydrocarbons passing through it. Therefore, little or no hydrocarbon flows downstream from the emission control device to enter the HC trap coupled to the exhaust bypass assembly. During this time, as seen from plot 512, there is negligible HC load in the HC trap. The heat from the exhaust is transferred to the coolant circulating through the heat exchanger, thereby increasing the coolant temperature. Coolant warm-up continues from time t2 to time t3 when the coolant temperature increases over a threshold. The coolant is circulated through the vehicle heater core and is used for supplying heat to the vehicle cabin.

At time t3, the coolant may be sufficiently warm but the diverter valve may be continued to be operated in the first position. At this time, based on engine speed, engine temperature, engine load and other operating conditions EGR may not be desired by the engine. Thereby, the EGR valve is maintained in closed position. In the first position, the diverter valve allows exhaust to enter the bypass assembly via the first inlet pipe. Thereafter this first amount of exhaust flows through the heat exchanger and HC trap in a first direction before returning to the main exhaust passage via the second outlet pipe. At this stage, the coolant is warm and also heat from the exhaust is continually transferred to the coolant further rising its temperature. The coolant from the heat exchanger is circulated through the heater core and the heat is utilized in increasing passenger cabin temperature. After time t3, as seen from plot 508, there is a marked increase in cabin temperature. Cabin heating may be continued until a cabin temperature desired by the operator is reached. Due to operation of the catalyst in the main exhaust passage, the HC load build up in the HC trap remains low.

In this way, depending on operating conditions, EGR may be delivered from the exhaust passage to the engine intake manifold. Hydrocarbons from the exhaust may be effectively trapped at the HC trap. Exhaust may flow in opposite directions through the heat exchanger and the HC trap. Depending on demand, heat recovered from the exhaust at the heat exchanger may be either transferred to the vehicle heater core for passenger cabin heating. A single cooler may be used to cool EGR and recover the heat energy from the exhaust gas.

An example method for an engine comprises operating in a first mode with exhaust gas flowing through an exhaust bypass, and in a first direction through each of an upstream heat exchanger and a downstream hydrocarbon trap coupled in the exhaust bypass, and then to an exhaust tailpipe; and operating in a second mode with exhaust flowing through an exhaust passage, then in a second, opposite direction through the heat exchanger, and the hydrocarbon trap and then to the engine intake. The preceding example, additionally or optionally further comprises selecting between the first and second mode based on engine temperature. In any or all of the preceding examples, additionally or optionally, the selecting includes selecting the first mode when the engine temperature is below a threshold, and selecting the second mode when the engine temperature is above the threshold, the threshold based on a catalyst light-off temperature. In any or all of the preceding examples, additionally or optionally, the exhaust bypass is coupled to a main exhaust passage, downstream of an exhaust catalyst via a diverter valve, the exhaust bypass further coupled to the main exhaust passage upstream of the tailpipe. In any or all of the preceding examples, additionally or optionally, operating in the first mode includes actuating the diverter valve to a first position wherein flow of exhaust from downstream of the exhaust catalyst into the bypass is enabled; and wherein operating in the second mode includes actuating the diverter valve to a second, different position wherein flow of exhaust from downstream of the exhaust catalyst into the bypass is disabled. In any or all of the preceding examples, additionally or optionally, the first direct direction includes flowing from an inlet of the heat exchanger, then through an outlet of the heat exchanger into an inlet of the HC trap and then through an outlet of the HC trap, and wherein the second direct direction includes flowing from the outlet of the HC trap, then through the inlet of the HC trap into the outlet of the heat exchanger into the inlet of the heat exchanger. In any or all of the preceding examples, additionally or optionally, the exhaust bypass is further coupled to the engine intake via an EGR passage including an EGR valve. In any or all of the preceding examples, the EGR passage is additionally or optionally coupled to the exhaust bypass upstream of the inlet of the heat exchanger. In any or all of the preceding examples, additionally or optionally, during the first mode, the EGR valve is closed and wherein during the second mode, the EGR valve is opened. Any or all of the preceding examples, additionally or optionally further comprises in response to a request for cabin heating, transitioning from operating in the second mode to operating in the first mode. In any or all of the preceding examples, additionally or optionally, the transitioning includes transitioning after a HC load of the HC trap is below a threshold, and transferring heat from the exhaust gas flowing through the exhaust bypass to the heat exchanger, then from the heat exchanger to coolant flowing through a heater core, and then heating a vehicle cabin by drawing heat from the heater core based on the request for cabin heating. In some examples, the order of flowing exhaust gas includes flowing exhaust gas in the order described without flowing exhaust gas through any intervening components therebetween. Thus, in one example, the described flowing includes flowing the exhaust gas only through the components listed in order. However, in an alternative embodiment, additional elements and catalysts can be added to the exhaust passage and bypasses.

Another example method for an engine comprises flowing exhaust gas through heat exchanger and then a hydrocarbon trap in an exhaust bypass when engine temperature is lower than a threshold; and flowing exhaust through the hydrocarbon trap and then the heat exchanger in the exhaust bypass when engine temperature is higher than the threshold. In the preceding example, additionally or optionally, the flowing through the heat exchanger and then the hydrocarbon trap includes storing exhaust hydrocarbons in the trap and wherein flowing through the hydrocarbon trap and then the heat exchanger includes purging exhaust hydrocarbons from the trap. Any or all of the preceding examples, additionally or optionally further comprises flowing the purged exhaust hydrocarbons to an engine intake via an EGR passage coupled to the exhaust bypass, upstream of the heat exchanger. In any or all of the preceding examples, additionally or optionally, the EGR passage includes an EGR valve, and wherein flowing the purged exhaust hydrocarbons to the engine intake includes adjusting an opening of the EGR valve. Any or all of the preceding examples, additionally or optionally further comprises, after a HC load of the HC trap is below a threshold, in response to a drop in engine coolant temperature, resuming flowing of exhaust gas through the heat exchanger and then the hydrocarbon trap, and transferring heat from the heat exchanger to an engine coolant.

In yet another example an engine system comprises an engine intake manifold; an engine exhaust manifold including an exhaust catalyst and each of an exhaust passage and an exhaust bypass, the bypass coupled parallel to the exhaust passage; each of a heat exchanger and a HC trap coupled in the exhaust bypass; a coolant system fluidly coupled to the heat exchanger and to a heater core; a diverter valve coupling the exhaust bypass to the exhaust passage downstream of the exhaust catalyst; a EGR passage coupling the exhaust bypass, upstream of the heat exchanger, to the intake manifold, the EGR passage including an EGR valve; and a controller with computer readable instructions stored on non-transitory memory for: closing the EGR valve and opening/closing (based on configuration) the diverter valve to flow exhaust gas from the catalyst to a tailpipe through the exhaust bypass in a first direction through the heat exchanger and then the HC trap; in response to an increase in engine temperature, opening the EGR valve while maintaining the diverter valve open/closed (based on configuration) to flow exhaust gas from the catalyst, along the exhaust passage, and then through the bypass in a second direction through the HC trap and then through the heat exchanger. The preceding example, additionally or optionally further comprising in response to a demand for cabin heating, continuing to flow exhaust gas through the bypass in the second direction until a HC load of the trap is below a threshold; and then, flow exhaust gas through the exhaust bypass in the first direction while transferring heat from the heat exchanger to the coolant system. Any or all of the preceding examples, additionally or optionally further comprising in response to a demand for cabin heating, continuing to flow exhaust gas through the bypass in the second direction until a HC load of the trap is below a threshold; and then, flow exhaust gas through the exhaust bypass in the first direction while transferring heat from the heat exchanger to the coolant system, and from the coolant system to the heater core. In any or all of the preceding examples, additionally or optionally, the flowing in the first direction is in response to exhaust temperature being below an activation temperature of the exhaust catalyst, and wherein the flowing in the second direction is in response to exhaust temperature being above the activation temperature of the exhaust catalyst.

In this way, a single heat exchanger may be utilized for fulfilling heating requirements of an engine system. A single heat exchanger may function as an EGR cooler and an exhaust heat exchanger, thereby cost and component reduction benefits can be achieved without limiting the functionality or capability of either system. By adding a Zeolite based HC trap downstream of the heat exchanger, during cold start conditions, hydrocarbons not converted at the catalyst may be effectively adsorbed from the cold exhaust. Additionally, the specific configuration of a single heat exchanger in the exhaust bypass assembly facilitates a shorter EGR passage length thereby reducing EGR transport delay. The technical effect of positioning the HC trap downstream of the heat exchanger is to prevent water condensation on the Zeolite, thereby maintaining its functionality. A diverter valve facilitates exhaust flow in both directions across the heat exchanger and the HC trap. As such, this improves the heat transfer efficiency, enables opportunistic purging of HC trap and reduces the requirement for long EGR passages. By improving hydrocarbon adsorption and heat recovery from exhaust using fewer components, engine fuel economy, performance and emissions quality is improved.

The invention claimed is:

1. A method, comprising:
   in a first mode, flowing engine exhaust gas through an exhaust bypass and in a first direction through each of an upstream heat exchanger and then a downstream hydrocarbon trap coupled in the exhaust bypass, and then to an exhaust tailpipe; and
   in a second mode at a different time, flowing exhaust gas through an exhaust passage, then in a second, opposite direction through the hydrocarbon trap and then the heat exchanger, and then to an engine intake, the exhaust bypass coupled to the engine intake via an EGR passage from upstream of an inlet of the heat exchanger via an EGR valve, wherein, during the first mode, the EGR valve is closed and wherein, during the second mode, the EGR valve is opened.

2. The method of claim 1, further comprising selecting between the first and second modes based on engine temperature.

3. The method of claim 2, wherein the selecting includes selecting the first mode when the engine temperature is below a threshold, and selecting the second mode when the engine temperature is above the threshold, the threshold based on a catalyst light-off temperature.

4. The method of claim 2, wherein the exhaust bypass is coupled to a main exhaust passage, downstream of an exhaust catalyst via a diverter valve, the exhaust bypass further coupled to the main exhaust passage upstream of the exhaust tailpipe.

5. The method of claim 4, wherein operating in the first mode includes actuating the diverter valve to a first position wherein flow of exhaust from downstream of the exhaust catalyst into the exhaust bypass is enabled; and wherein operating in the second mode includes actuating the diverter valve to a second, different position wherein flow of exhaust from downstream of the exhaust catalyst into the exhaust bypass is disabled.

6. The method of claim 2, wherein the first direction includes flowing from the inlet of the heat exchanger, then through an outlet of the heat exchanger into an inlet of the hydrocarbon trap and then through an outlet of the hydrocarbon trap, and wherein the second direction includes flowing from the outlet of the hydrocarbon trap, then through the inlet of the hydrocarbon trap into the outlet of the heat exchanger into the inlet of the heat exchanger.

7. The method of claim 1, further comprising, in response to a request for cabin heating, transitioning from operating in the second mode to operating in the first mode, wherein a coolant system is fluidly coupled to the heat exchanger and to a heater core.

8. The method of claim 7, wherein the transitioning includes transitioning after a hydrocarbon load of the hydrocarbon trap is below a threshold, and transferring heat from the exhaust gas flowing through the exhaust bypass to the heat exchanger, then from the heat exchanger to coolant flowing through the heater core, and then heating a vehicle cabin by drawing heat from the heater core based on the request for cabin heating.

9. A method for an engine, comprising:
flowing exhaust gas through a heat exchanger and then a hydrocarbon trap in an exhaust bypass when engine temperature is lower than a threshold; and
flowing exhaust gas through the hydrocarbon trap and then the heat exchanger in the exhaust bypass when engine temperature is higher than the threshold, wherein the flowing through the heat exchanger and then the hydrocarbon trap includes storing exhaust hydrocarbons in the hydrocarbon trap and wherein flowing through the hydrocarbon trap and then the heat exchanger includes purging exhaust hydrocarbons from the hydrocarbon trap, the method further comprising flowing the purged exhaust hydrocarbons to an engine intake via an EGR passage coupled to the exhaust bypass, upstream of the heat exchanger, after a hydrocarbon load of the hydrocarbon trap is below a threshold, and in response to a drop in engine coolant temperature, resuming flowing of exhaust gas through the heat exchanger and then the hydrocarbon trap, and transferring heat from the heat exchanger to an engine coolant.

10. The method of claim 9, wherein the EGR passage includes an EGR valve, and wherein flowing the purged exhaust hydrocarbons to the engine intake includes adjusting an opening of the EGR valve.

11. An engine system, comprising:
an engine intake manifold;
an engine exhaust manifold including an exhaust catalyst and each of an exhaust passage and an exhaust bypass, the bypass coupled parallel to the exhaust passage;
each of a heat exchanger and a hydrocarbon (HC) trap coupled in the exhaust bypass;
a coolant system fluidly coupled to the heat exchanger and to a heater core;
a diverter valve coupling the exhaust bypass to the exhaust passage downstream of the exhaust catalyst;
a EGR passage coupling the exhaust bypass, upstream of the heat exchanger, to the intake manifold, the EGR passage including an EGR valve; and
a controller with computer readable instructions stored on non-transitory memory for:
closing the EGR valve and opening/closing the diverter valve to flow exhaust gas from the catalyst to a tailpipe through the exhaust bypass in a first direction through the heat exchanger and then the HC trap; and
in response to an increase in engine temperature, opening the EGR valve while maintaining the diverter valve open/closed to flow exhaust gas from the catalyst, along the exhaust passage, and then through the exhaust bypass in a second direction through the HC trap and then through the heat exchanger.

12. The system of claim 11, further comprising, in response to a demand for cabin heating, continuing to flow exhaust gas through the exhaust bypass in the second direction until a HC load of the HC trap is below a threshold; and
then, flow exhaust gas through the exhaust bypass in the first direction while transferring heat from the heat exchanger to the coolant system.

13. The system of claim 12, further comprising in response to the demand for cabin heating, continuing to flow exhaust gas through the exhaust bypass in the second direction until the HC load of the HC trap is below the threshold; and
then, flow exhaust gas through the exhaust bypass in the first direction while transferring heat from the heat exchanger to the coolant system, and from the coolant system to the heater core.

14. The system of claim 11, wherein the flowing in the first direction is in response to exhaust temperature being below an activation temperature of the exhaust catalyst, and wherein the flowing in the second direction is in response to exhaust temperature being above the activation temperature of the exhaust catalyst.

* * * * *